(12) United States Patent
Gibson et al.

(10) Patent No.: US 7,809,492 B2
(45) Date of Patent: Oct. 5, 2010

(54) METHOD FOR CONTROLLING AIR-FUEL RATIO FOR AN ALTERNATING VALVE ENGINE

(75) Inventors: Alexander O'Connor Gibson, Ann Arbor, MI (US); Ilya Vladimir Kolmanovsky, Novi, MI (US); John Ottavio Michelini, Sterling Heights, MI (US); Gang Song, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/727,425

(22) Filed: Mar. 19, 2010

(65) Prior Publication Data

US 2010/0180840 A1     Jul. 22, 2010

Related U.S. Application Data

(63) Continuation of application No. 11/869,038, filed on Oct. 9, 2007, now Pat. No. 7,715,974.

(51) Int. Cl.
*G06F 19/00* (2006.01)
*F01L 1/34* (2006.01)
*F02M 51/00* (2006.01)

(52) U.S. Cl. .............. 701/104; 701/105; 123/90.15; 123/432

(58) Field of Classification Search .......... 123/90.11, 123/90.15–90.18, 295, 299, 300, 302, 308, 123/316, 406.47, 432, 478, 480; 701/101–105, 701/110, 115
See application file for complete search history.

(56) References Cited

U.S. PATENT DOCUMENTS

| 4,552,112 | A | * | 11/1985 | Nagao et al. | 123/432 |
|---|---|---|---|---|---|
| 4,889,100 | A | * | 12/1989 | Nakaniwa et al. | 123/492 |
| 4,911,132 | A | * | 3/1990 | Nakaniwa et al. | 123/492 |
| 5,558,060 | A | * | 9/1996 | Horie et al. | 123/308 |
| 5,647,312 | A | * | 7/1997 | Salber et al. | 123/90.16 |
| 6,357,403 | B1 | * | 3/2002 | Yano | 123/90.11 |
| 6,546,910 | B2 | * | 4/2003 | Tanaka et al. | 123/348 |
| 6,553,961 | B2 | * | 4/2003 | Hammoud et al. | 123/308 |
| 7,028,650 | B2 | * | 4/2006 | Lewis et al. | 123/432 |
| 7,051,687 | B2 | * | 5/2006 | Shimizu et al. | 123/90.11 |
| 7,104,243 | B2 | * | 9/2006 | Winstead | 123/198 F |
| 7,150,267 | B2 | * | 12/2006 | Kuriki et al. | 123/432 |
| 7,246,595 | B1 | * | 7/2007 | Hoare et al. | 123/299 |
| 7,281,527 | B1 | * | 10/2007 | Bryant | 123/432 |
| 7,448,359 | B2 | * | 11/2008 | Jankovic | 123/432 |
| 7,644,586 | B2 | * | 1/2010 | Yamagata | 60/612 |
| 7,715,974 | B2 | * | 5/2010 | Gibson et al. | 701/103 |
| 2004/0206334 | A1 | * | 10/2004 | Yoshida et al. | 123/432 |
| 2007/0246006 | A1 | * | 10/2007 | Ma et al. | 123/308 |
| 2008/0035125 | A1 | * | 2/2008 | Jankovic | 123/90.15 |
| 2008/0147302 | A1 | * | 6/2008 | Kolmanovsky et al. | 701/105 |

FOREIGN PATENT DOCUMENTS

| JP | 06280659 | A | * | 10/1994 | 123/432 |
|---|---|---|---|---|---|
| JP | 07166925 | A | * | 6/1995 | 123/432 |
| JP | 07166926 | A | * | 6/1995 | 123/432 |

* cited by examiner

*Primary Examiner*—Willis R Wolfe, Jr.
(74) *Attorney, Agent, or Firm*—Allan J. Lippa; Alleman Hall McCoy Russell & Tuttle LLP

(57) ABSTRACT

A method for controlling the air-fuel ratio of an internal combustion engine operating with alternating intake valves is presented. According to the method, engine air-fuel ratio can be adjusted by changing valve timings or fuel during a cylinder cycle.

20 Claims, 5 Drawing Sheets

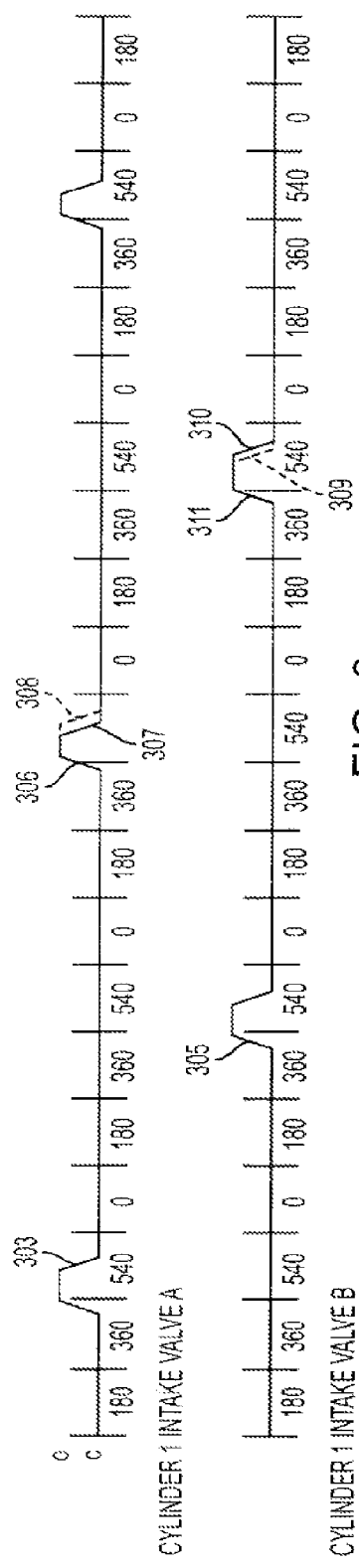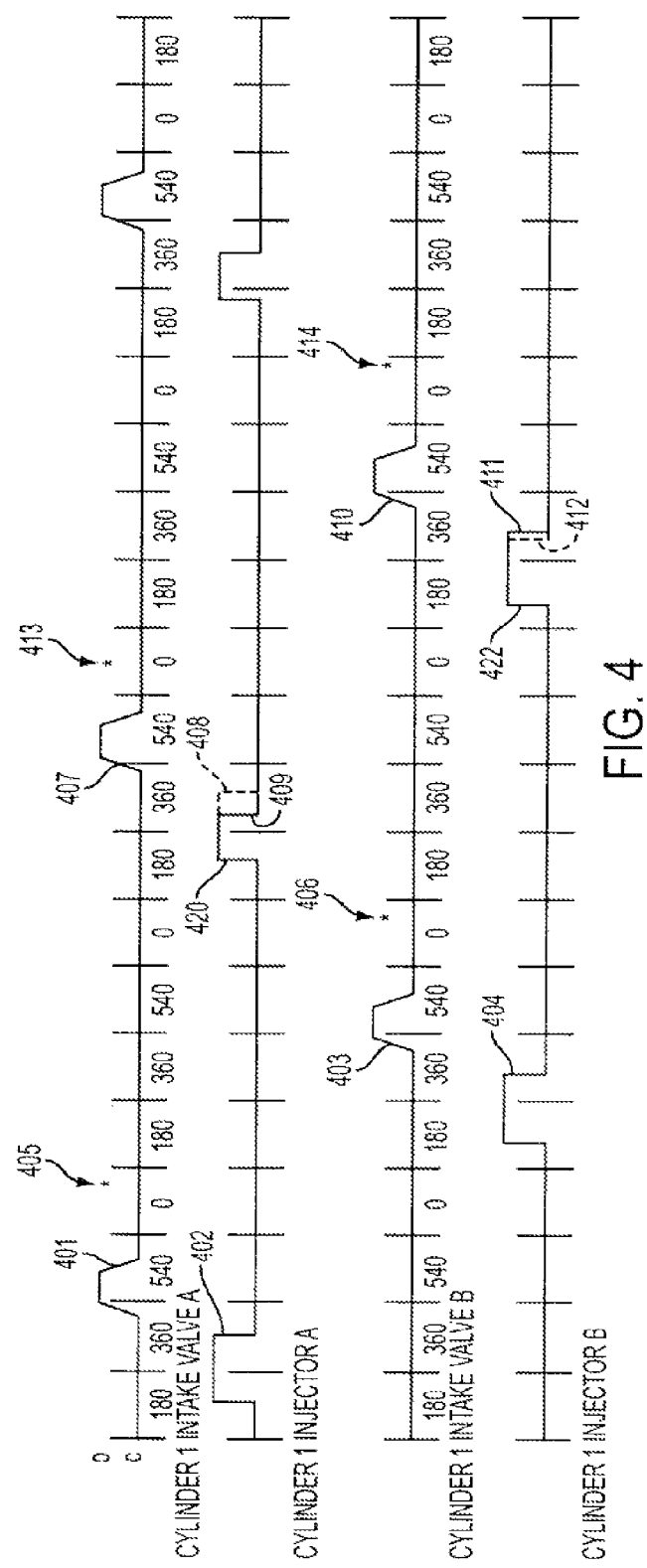

METHOD FOR CONTROLLING AIR-FUEL RATIO FOR AN ALTERNATING VALVE ENGINE

CROSS REFERENCE TO RELATED APPLICATION

The present application is a continuation of U.S. patent application Ser. No. 11/869,038, filed Oct. 9, 2007, entitled "Method for Controlling Air-Fuel Ratio for an Alternating Valve Engine", now U.S. Pat. No. 7,715,974 the entire contents of each of which are incorporated herein by reference.

FIELD

The present description relates to a method for improving air-fuel ratio control of an internal engine operating with alternating intake valve timing.

BACKGROUND

One method to operate randomly operable valves in an internal combustion engine is described in U.S. Pat. No. 7,066,121. This method describes two intake valves of a cylinder are alternatively actuated, or opened, during different cylinder cycles of the cylinder (a cylinder cycle is defined herein as the period in crank angle duration wherein a operation of a cylinder repeats; e.g., in the case of a four-stroke cylinder cycle a cylinder cycle is 720 crankshaft angle degrees, but note that a cylinder cycle may increase or decrease depending on the number of strokes per cylinder cycle). That is, the first of two intake valves is held closed while the second intake valve opens during a cylinder cycle. Then, during the following cylinder cycle, the second valve remains closed while the first intake valve opens. In this way, opening events for the first and second intake valves are alternated every other cylinder cycle. This mode of operation may reduce power consumption and improve the cylinder air amount control.

The above-mentioned method can also have several disadvantages. For example, cylinder breathing characteristics may change depending on the valve that is operated during a particular cylinder cycle. That is, the cylinder may intake more air or less air when one valve is operated as compared to the other valve. This can cause engine air-fuel variation and engine torque variation, at least in some conditions.

The inventors herein have recognized the above-mentioned disadvantages and have developed a method of improving alternating intake valve control that offers substantial improvements.

SUMMARY

One embodiment of the present description includes providing a method to adjust air-fuel ratio of at least a cylinder of an internal combustion engine having variable valve timing, the method comprising: operating at least a cylinder of an internal combustion engine having first and second intake valves; opening said first intake valve at least once during a first cycle of said cylinder and holding said first intake valve closed during a second cycle of said cylinder, said second cycle of said cylinder following said first cycle of said cylinder; holding said second intake valve closed during said first cylinder cycle and opening said second intake valve at least once during said second cylinder cycle; and opening said first intake valve and said second intake valve during said first and second cylinder cycles at different timings relative to crankshaft position of said internal combustion engine. This method overcomes at least some of the disadvantages of the prior art.

Engine and cylinder air-fuel control can be improved for an engine operating alternating intake valves during alternate cylinder cycles by operating the intake valves at different timings. By operating valves at different timings, differences between cylinder intake port geometry and port flow can be compensated such that substantially the same amount of air is inducted to a cylinder when valves are alternately operated (i.e., opened) during alternate cylinder cycles. This can improve cylinder and engine air-fuel control because the amount of air inducted during each cylinder cycle remains substantially constant (i.e., within ±0.05 units of load where load is the amount of air inducted into a cylinder divided by theoretical cylinder air capacity that ranges between 0-1) when valves are alternately operated.

In an alternative embodiment, valve timing can be substantially the same between alternating valve operations (e.g., ±5 crankshaft angle degrees) while the fuel injection amount is varied between alternating cylinder cycles. This method can be used to achieve similar air-fuel ratios between cylinder events even though the cylinder may have different air amounts between cylinder cycles. And if desired, spark timing can also be varied each cylinder cycle to equalize the torque generated by the cylinder if different amounts of air are inducted during alternating cylinder cycles.

The present description may provide several advantages. In particular, the approach can improve engine emissions when energy is being saved by only opening one of two intake valves during a cylinder cycle. Further, the method can make cylinder torque production more uniform when two intake valves are alternatively operated during alternate cylinder cycles. Further still, the method can be used to account for differences in fuel puddles that may accumulate in intake ports when intake valves are alternatively operated. As a result, the inventors have achieved synergistic benefits that heretofore have not been achievable, at least during some conditions.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 3 is an example plot of valve timing adjustments; and

FIG. 4 is an example plot of valve timing adjustments;

DETAILED DESCRIPTION

Figure 1:
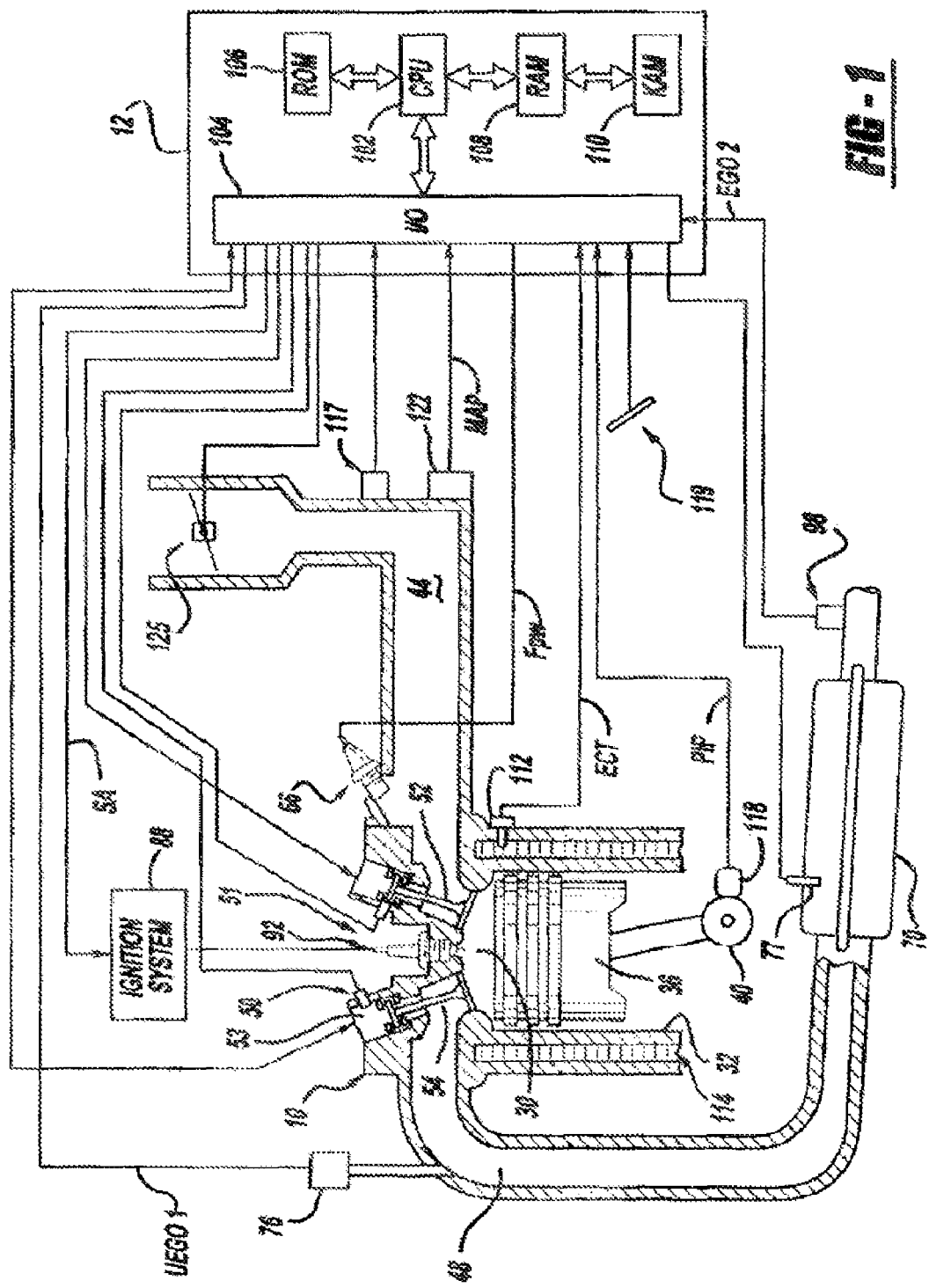
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve is operated by an electromechanically controlled valve coil and armature assembly 53. Alternatively, the intake valve 52 or exhaust valve 54 may be mechanically actuated. Armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. In an alternative embodiment, two injectors may supply fuel to cylinder 30. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined. Controller 12 storage medium read-only-memory 106 can be programmed with computer readable data representing instructions executable by processor 102 for performing the methods described below.

Figure 2:
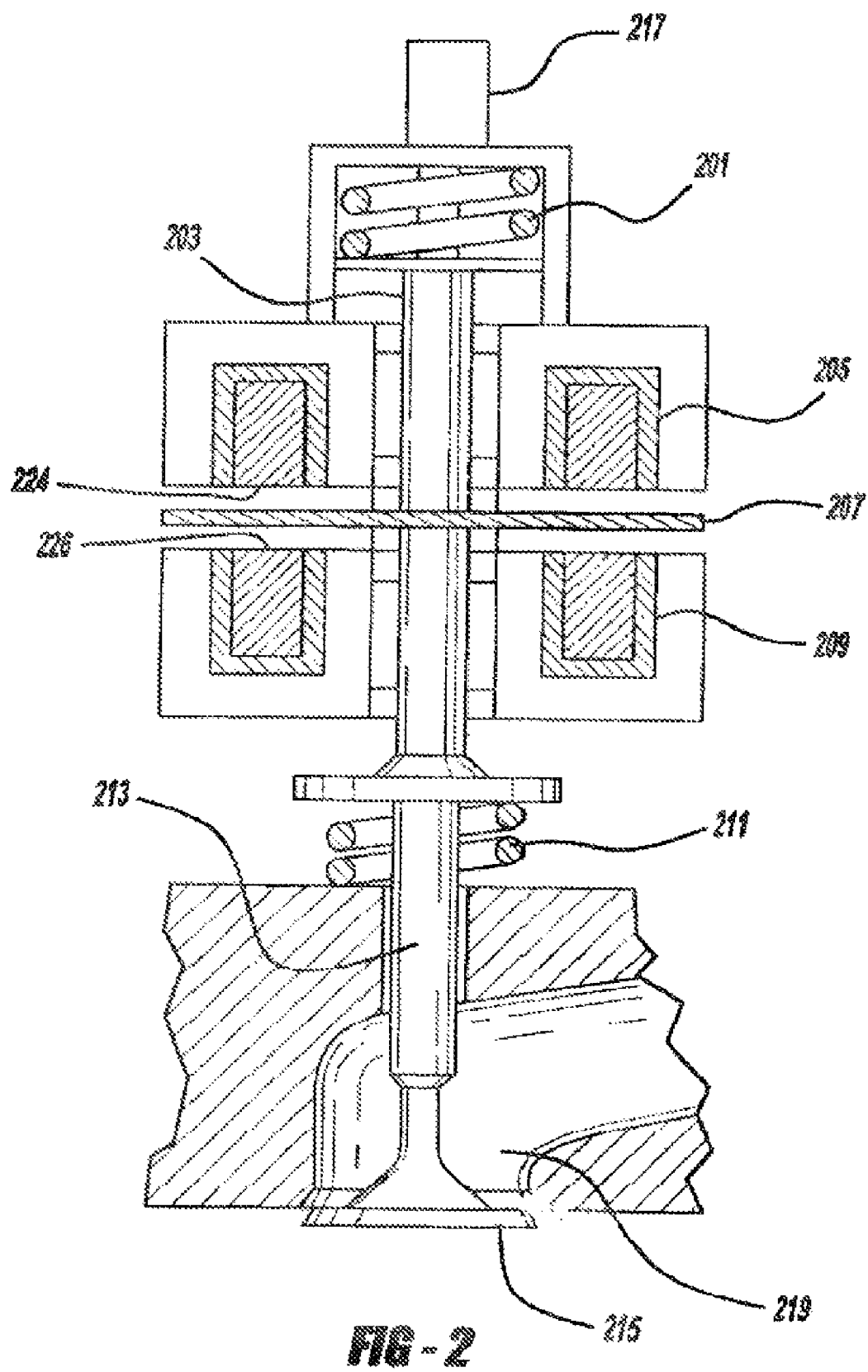
FIG. 2 is a schematic diagram that shows an electrically actuated valve in a neutral state.

Referring to FIG. 2, a schematic of an example electrically actuated valve is shown. The valve actuator is shown in a de-energized state (i.e., no electrical current is being supplied to the valve actuator coils). The electromechanical valve apparatus is comprised of an armature assembly and a valve assembly. The armature assembly is comprised of an armature return spring 201, a valve closing coil 205, a valve opening coil 209, an armature plate 207, a valve displacement transducer 217, and an armature stem 203. When the valve coils are not energized the armature return spring 201 opposes the valve return spring 211, valve stem 213 and armature stem 203 are in contact with one another, and the armature plate 207 is essentially centered between opening coil 209 and closing coil 205. This allows the valve head 215 to assume a partially open state with respect to the port 219. When the armature is in the fully open position the armature plate 207 is in contact with the opening coil magnetic pole face 226. When the armature is in the fully closed position the armature plate 207 is in contact with the closing coil magnetic pole face 224.

In one embodiment, armature plate 207 includes permanent magnets. In another embodiment, armature plate 207 does not include permanent magnets. Permanent magnets may be used to reduce valve actuator current because the permanent magnet can hold the valve in a closed position in the absence of a holding current, at least during some conditions.

Typically, valve actuators comprising permanent magnet armatures can repel and attract the armature by controlling current to the opening and/or closing coil. On the other hand, other types of valve actuators may be limited to attracting an armature, non-permanent magnet armature actuators for example. By applying force to actuator armature 203, valve opening spring 201 and/or magnetic force can cause armature plate 207 to move away from closing coil pole face 224. As a result, this armature movement can cause valve 213 to lift off the valve seat and begin to open port 219.

Engines that operate with alternating intake valves can exhibit undesirable variation of cylinder air-fuel ratio. The variation may result from inducting different amounts of air during different cylinder cycles, even when valve timings of alternating valves are substantially the same. The air-fuel variation can result from a cylinder inducting different cylinder air amounts each cylinder cycle. This may result from geometric differences in cylinder ports or from valve actuator differences, for example. And since air-fuel variation from the desired cylinder air-fuel can increase engine emissions and degrade engine torque control, it is desirable to mitigate cylinder air-fuel deviations.

Referring now to FIG. 3, an example of simulated alternating intake valve strategy to control cylinder air-fuel ratio is shown. In an alternating valve strategy, two intake or two exhaust valves of a cylinder are operated (opened and closed) during alternating cycles of a cylinder. In one example, where a cylinder cycle is four strokes or 720 crankshaft angle degrees, a first of two intake valves is operated during a 720 crankshaft angle degree interval without operating the second intake valve, then the second intake valve is operated during the next 720 crankshaft angle degrees without operating the first intake valve. In this way, two different intake valves are operated, one or more times each, over a 1440 crankshaft angle degree interval.

In FIG. 3, the valve trajectory labeled "Valve A" represents a first intake valve operating in a cylinder. Valve timing for one cylinder of a multi-cylinder engine is illustrated. The valve trajectory labeled "Valve B" represents a second intake valve operating in the same cylinder. The left hand side of intake valve trajectory "A" is labeled with "O" and "C". The "O" identifies that the valve is open when the valve trajectory is near the "O." The "C" identifies that the valve is closed when the valve trajectory is near the "C." Each valve trajectory can be related to engine position by the vertical markers that subdivide the valve trajectory trace. The numbers are associated with the vertical marker to the right of the number. The number zero corresponds to top-dead-center compression stroke for the illustrated cylinder.

Intake valve opening events 303 and 305 represent intake events wherein the valve opening duration for valves "A" and "B" are substantially identical in duration (e.g., ±4 crankshaft angle degrees). Valve durations for alternating valves can be substantially the same when the desired cylinder air amount (i.e., the desired amount of air that is inducted into a cylinder during a cylinder cycle) is substantially constant (e.g., ±0.5 engine load), when engine speed is substantially constant (e.g., ±150 RPM), and when substantially equal valve timings cause substantially constant engine air amounts to be inducted into a cylinder during different cylinder cycles. In another example, intake valve timings can be made substantially the same if it is desirable to change the cylinder air amount during each cylinder cycle and if substantially equal valve timings alter the inducted cylinder air amount.

Intake valve opening events 306 and 311 provide one illustration of how valve timing can be changed to adjust cylinder air-fuel ratio where valves operate during alternative cylinder cycles. Valve opening event 306 occurs at the same crankshaft position as valve opening interval 303, but valve opening event 306 ends earlier at closing event 307. This reduces the cylinder air charge. The dotted line illustrating valve closing event 308, is shown to contrast the different valve timing duration between valve opening event 303 and the valve opening event shown between the valve transitions at 306 and 307. That is, valve event 303 is the same duration as the phantom valve opening event represented by transitions 306 and 308. Thus, the valve opening event between valve transitions 306 and 307 is shorter in duration as compared to the duration that the valve is open as is illustrated by the valve opening duration of valve opening event 303.

On the other hand, the valve opening event beginning at transition 311 increases the valve opening time as compared to the valve opening event at 305. The valve opening event that begins at 311 ends at valve transition 310. The dotted line illustrating valve closing event 309, is shown to contrast the difference in valve timing duration between valve opening event 303 and the valve opening event shown between valve transitions at 311 and 310. Obviously, the valve opening event between valve transitions at 311 and 309 is longer in duration as compared to the duration that the valve is open as is illustrated by the valve opening duration of valve opening event 305.

The valve opening events beginning at 306 and 311 represent one way that valve timings can be used to change air-fuel ratio of a cylinder that operates with alternating valves. In this example, feedback from induction events corresponding to intake valve openings at 303 and 305 are compared to a desired cylinder air charge. When the desired cylinder air charge is less than the amount of air inducted into a cylinder when valve "A" is opened, the opening duration of valve "A" can be decreased such that the cylinder air amount then inducted to the cylinder substantially matched the desired cylinder air charge. This is represented by valve transitions 306 and 308. When the desired cylinder air charge is more than the amount of air inducted into a cylinder when valve "B" is opened, the opening duration of valve "B" can be increased such that the cylinder air amount then inducted to the cylinder substantially matched the desired cylinder air charge. This is represented by valve transitions 311 and 310.

Thus, the individual valve timings of a cylinder operating with alternating intake valves can be used to control cylinder air-fuel ratio.

Figure 6:
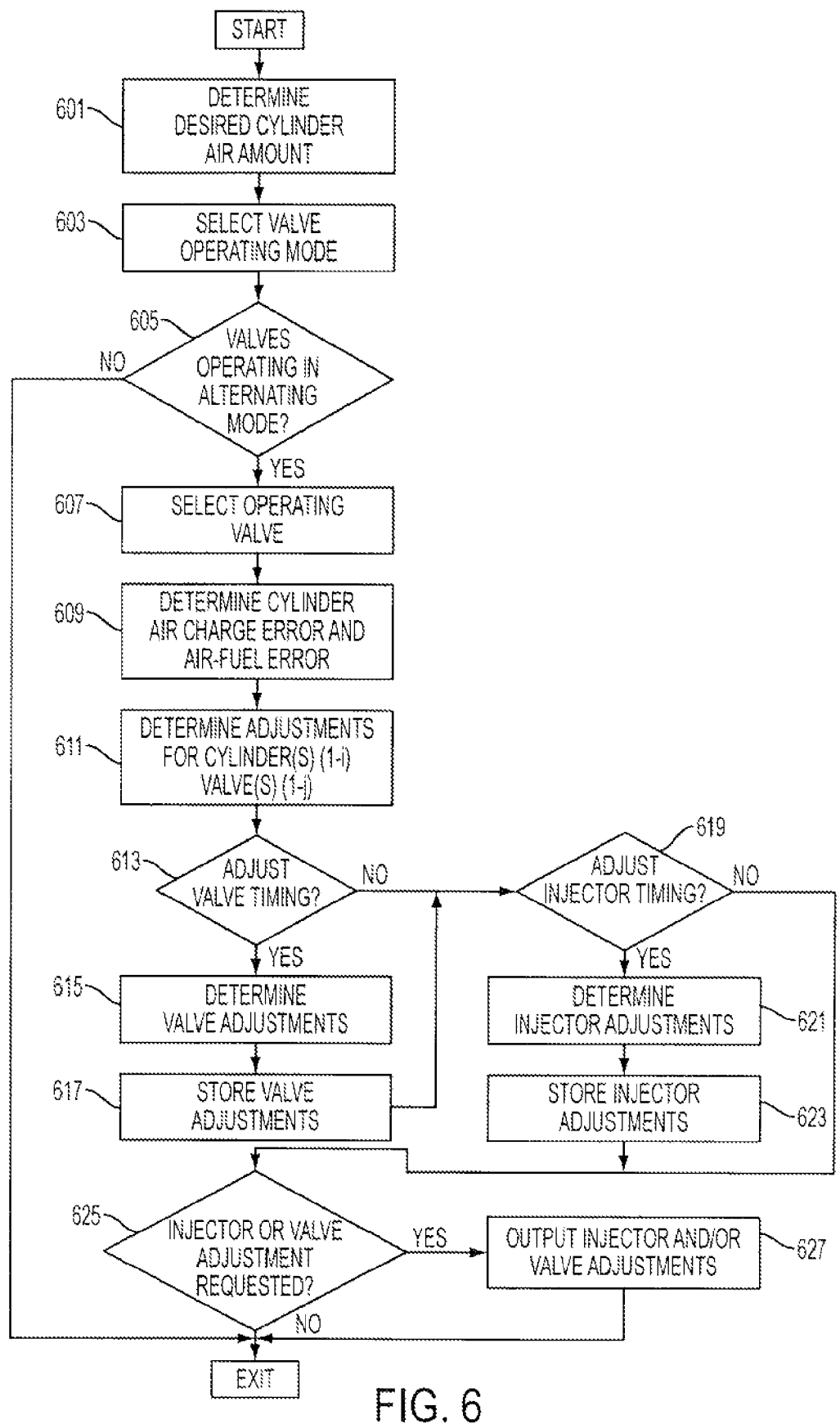
FIG. 6 is an example of a flow chart of an air-fuel control strategy.

Note that the method described in FIG. 6 is capable of controlling cylinder air-fuel as shown in FIG. 3. Further, valve timing that adjusts valve phase (i.e., the valve opening and/or closing position relative to the crankshaft position, whether or not the valve opening duration is changed) can also be used to adjust cylinder air-fuel ratio when an engine is operating with alternating valves. If valve phase is adjusted, valve timing can be retarded to decrease cylinder air charge and valve timing can be advanced to increase cylinder air charge.

In another embodiment, if the engine controller determines that a cylinder operating with alternating valve timing is deviating from operating at a desired air-fuel ratio, then the amount of fuel injected to individual intake ports of a cylinder can be adjusted. This action allows the engine controller to compensate for differences in a cylinder's air-fuel mixture without necessarily having to adjust the valve timing for the two valves that operate during different cycles of a cylinder (i.e., each valve operates every-other cylinder cycle and the valves operate during different cylinder cycles). Also note that both valve timing durations can be increased or decreased in some circumstances.

Referring now to FIG. 4, another example of simulated alternating intake valve strategy to control cylinder air-fuel ratio is shown. Valve timing for one cylinder of a multi-cylinder engine is illustrated. The labeling of valve trajectories that are shown in FIG. 4 follows a similar convention as that shown in FIG. 3. The signal labeled "Cylinder 1 Injector A" represents a fuel injector signal for delivering fuel to a cylinder. Likewise, the signal labeled "Cylinder 1 Injector B" represents another fuel injector signal for delivering fuel to the cylinder. That is, the cylinder is configured with two fuel injectors, one directed to the port supplying air through valve "A," that is injector "A," and the other directed to the port supplying air through valve "B," that is injector "B." This arrangement allows an engine controller to supply two distinct fuel amounts to two different intake ports. As a result, different fuel amounts can be delivered to a cylinder in such a way that links or times a fuel injection event to a particular intake valve opening event.

In FIG. 4, intake valve opening events 401, 407, 403, and 410 are substantially the same in opening duration. However, as previously mentioned, this does not ensure that the amount of air inducted into the cylinder is the same between alternating valve opening events (i.e., when different valves open during different cylinder cycles). This embodiment adjusts injector timing to achieve a desired cylinder air-fuel ratio, even when valve timings allow different amounts of air to be inducted into the cylinder. The injection events (i.e., when fuel is injected to a cylinder port) at 402 and 404 represent substantially the same duration injection events (i.e., ±2 milisecond). If feedback indicates that the cylinder is combusting air-fuel mixtures that deviate from a desired air-fuel ratio, the fuel delivered by each injector can be adjusted. Injection events beginning at 420 and 422 show such an example.

Note that the spark event identified as an "*" at 405 is used to initiate combustion of fuel injected at injection event 402 and air inducted at valve opening event 401.

The injection event beginning at 420 ends at 409 and is inducted into the cylinder during valve opening event 407. The dotted line at 408 is shown as a reference to the duration of the prior injection event. That is, if the injection event were bounded by events 420 and 408, then the injection duration or fuel amount would be the same as that shown at 402. From this reference it can be seen that the injection event beginning at 402 has a duration that is reduced from the injection event at 402. By reducing the injection duration, the amount of fuel delivered to a cylinder is also reduced. As a result, the cylinder air-fuel ratio can be increased (e.g., moved from 13.3:1 to 14:1) for a particular cylinder cycle in order to match the actual cylinder air-fuel ratio the desired air-fuel ratio.

The combustion event associated with intake valve opening event 407 is initiated by spark event 413. It can be observed that the spark event at 413 is more advanced than the spark event at 405. In this example, the spark is advanced in an effort to equalize the torque between the combustion event initiated by the spark event at 405 and the combustion event initiated by the spark event at 413.

The injection event beginning at 422 ends at 411 and is inducted into the cylinder during valve opening event 410. The dotted line at 412 is shown as a reference to the duration of the prior injection event. From this reference it can be seen that the injection event beginning at 422 has a duration that is increased from the injection event at 404. By increasing the injection duration, the amount of fuel delivered to a cylinder is increased. As a result, the cylinder air-fuel ratio can be decreased (e.g., moved from 15.3:1 to 14:1) for a particular cylinder cycle in order to match the actual cylinder air-fuel ratio the desired air-fuel ratio.

The combustion event associated with intake valve opening event 410 is initiated by spark event 414. It can be observed that the spark event at 414 is more retarded than the spark event at 406. In this example, the spark is retarded in an effort to equalize the torque between the combustion event initiated by spark event 406 and the combustion event initiated by the spark event at 414.

Note that the method described in FIG. 6 is capable of controlling cylinder air-fuel as shown in FIG. 4. Further, valve timing that adjusts valve phase (i.e., the valve opening and/or closing position relative to the crankshaft position, whether or not the valve opening duration is changed) can also be used to adjust cylinder air-fuel ratio when an engine is operating with alternating valves.

Figure 5:
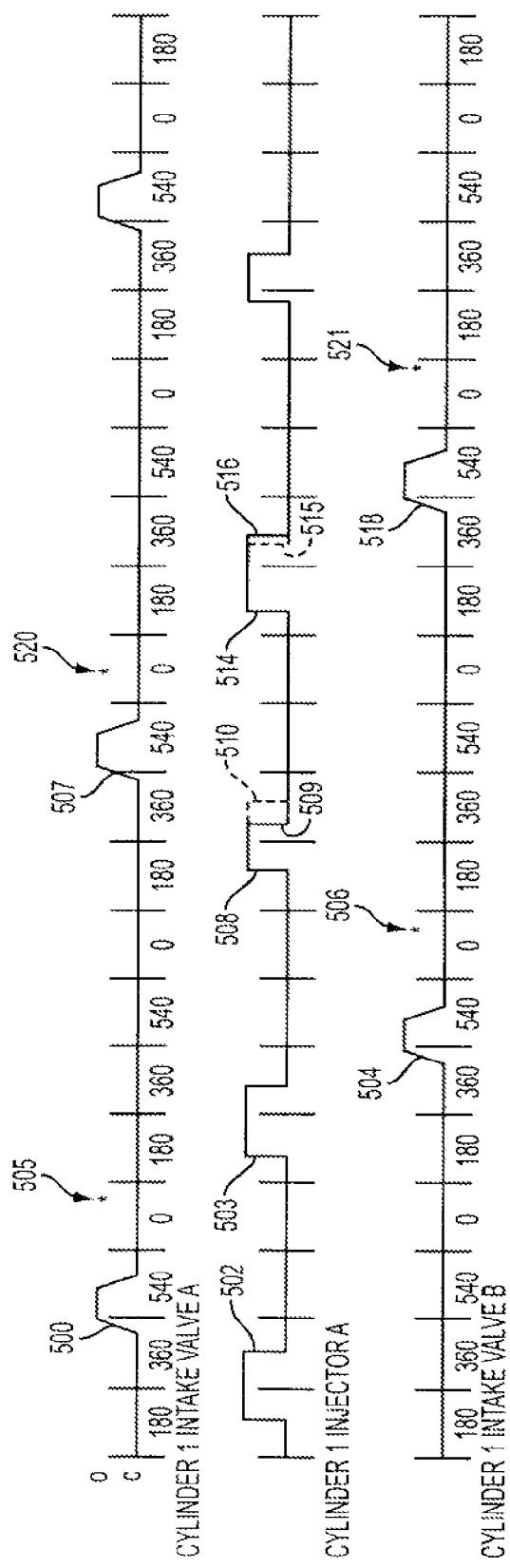
FIG. 5 is an example plot of valve timing adjustments.

Referring now to FIG. 5, another example of simulated alternating intake valve strategy to control cylinder air-fuel ratio is shown. Intake valve timing for one cylinder of a multi-cylinder engine is illustrated. The labeling of intake valve trajectories and injector events that are shown in FIG. 5 follows a similar convention as those shown in FIGS. 3 and 4. This figure illustrates an embodiment wherein a single injector supplies fuel to both intake ports of the same cylinder and where operation of intake valves is alternated each cylinder cycle.

Fuel injection events 502 and 503 are associated with intake valve opening events 500 and 504. When fuel is injected at 502, it is at least partially inducted into the cylinder during intake valve opening event 500. A portion of the fuel injected at 502 is also directed to the cylinder port that leads into the cylinder via intake valve "B." This fuel remains in the port until intake valve opening event 504, and then at least a portion of the fuel is inducted into the cylinder. Likewise, a portion of the fuel injected at injection event 503 remains in the intake port leading to the cylinder via valve "A" until at least a portion of the fuel in the port is inducted at intake valve opening event 507. Another portion of the fuel injected at 503 is inducted at intake event 504. Thus, there are two injection events directed at a particular intake port for every induction event that passes through that particular intake port.

If the desired cylinder air-fuel is achieved over two combustion events of a single cylinder by using substantially the same intake valve timings and injecting substantially the same fuel amounts, then the amount of fuel delivered during alternating valve events can remain substantially the same. However, if the air-fuel mixture during one or both of the combustion events differs from the desired air-fuel ratio, then the amount of fuel injected can be used to compensate the air-fuel ratio of subsequent combustion events. In particular, the cylinder mixture inducted during a particular intake valve opening event can be compensated by adjusting the fuel amount that is delivered during the fuel injection event that occurs during or just prior to the intake valve opening event.

In one example, fuel can be injected a first time during a first cylinder cycle and a second time during a second cylinder cycle; a first intake valve can be opened during the first cylinder cycle while a second intake valve is held closed and the second intake valve can be opened during the second cylinder cycle while the first intake valve is held closed; and a fuel injector can inject fuel during the first cylinder cycle and during the second cylinder cycle.

This sequence allows an engine controller to vary the amount of fuel injected during the first and second injections such that different cylinder air-fuel ratios are combusted during the first and second cylinder cycles. There are two fuel injections associated with each individual intake valve opening. A first fuel injection associated with a first intake valve occurs during the cylinder cycle when the first intake valve remains closed and a second intake valve opens. This first fuel injection associated with the first intake valve creates fuel vapor and a fuel puddle in the intake port of the first intake valve. A second fuel injection associated with a first intake valve occurs during the cylinder cycle when the second valve remains closed and a first intake valve opens. Thus, each of the first and second intake valves is associated with a first fuel injection that occurs during a cylinder cycle when the respective intake valve is closed. And each of the first and second intake valves is also associated with a fuel injection that occurs during a cylinder cycle when the respective intake valve is opened. Consequently, the second fuel injection event associated with each intake valve can be used to adjust the individual cylinder air-fuel ratio when a particular intake valve is operated during a cylinder cycle.

In one example, cylinder air-fuel ratio associated with a particular intake valve opening event can be adjusted by the limits of the second fuel injection. For example, if the second fuel injection is skipped and no fuel delivered, then the cylinder air-fuel ratio created during the following induction event is determined by the amount of fuel injected during the first injection. However, the cylinder air-fuel ratio can be increased beyond the amount of fuel delivered during the first fuel injection by simply increasing the amount of fuel during the second injection. Thus, the second fuel injection can be used to adjust the range of cylinder air-fuel control.

In FIG. 5, fuel injection events beginning at 508 and 514 are adjusted from the previous injection events at 502 and 503. Injection events 502 and 508 occur just before intake valve "A" opens; therefore, adjustments to the injection event beginning at 508 can be made to adjust the air-fuel ratio for the combustion event that is initiated by the spark event at 520. Injection events 503 and 514 occur just before intake valve "B" opens; therefore, adjustments to the injection event beginning at 514 can be made to adjust the air-fuel ratio for the combustion event that is initiated by the spark event at 521.

The fuel injection event that begins at 508 ends at 509. The dotted line 510 is used to provide a reference from which a comparison may be made between the last fuel injection command that occurred prior to intake valve "A" opening (i.e., 502) and the fuel injection at 508. Since valve timing is constant and the fuel injection beginning at 508 is shorter in duration, the cylinder mixture will be enleaned from the cylinder mixture affected by the injection at 502. Spark is advanced at 520 as compared to spark at 505 in an effort to mitigate torque loss that may accompany leaning out the cylinder air-fuel mixture.

The fuel injection event that begins at 514 ends at 516. The dotted line here also provides a reference from which the last fuel injection command that occurred prior to intake valve "B" opening (i.e., 530) can be compared to the fuel injection that occurs at 514. Since valve timing is constant and since the fuel injected beginning at 514 is longer in duration, the cylinder mixture will be enriched from the cylinder mixture affected by the injection at 503. Spark is retarded at 521 as compared to spark at 506 in an effort to mitigate torque loss that may accompany richening the cylinder air-fuel mixture.

Referring now to FIG. 6, a flow chart of an example air-fuel control correction algorithm is shown. At step 601, desired cylinder air amount and exhaust gas recirculation (EGR) can be determined. In one example, operator demand (desired brake torque) can be determined by sensing pedal position sensor 119 and it may be converted to a desired brake torque. By knowing the current engine speed and operator demand, a desired cylinder air amount can be established from empirically determined tables or from regressed data. The method described in U.S. Pat. No. 7,072,758 can be used to determine cylinder air charge and the application is hereby fully incorporated into this description by reference. Specifically, the method relates engine torque to individual cylinder pressure and uses a regression to determine an amount of fuel to be delivered to individual cylinders.

Cylinder pumping and friction losses of an active cylinder can be based on the following regression equations A and B:

$$PMEP_{Act} = C_0 + C_1 \cdot V_{IVO} + C_2 \cdot V_{EVC} + C_3 \cdot V_{IVC\text{-}IVO} + C_4 \cdot N \qquad \text{Equation A}$$

where $PMEP_{Act}$ is pumping mean effective pressure, $C_0$-$C_4$ are stored, predetermined, polynomial coefficients, $V_{IVO}$ is cylinder volume at intake valve opening position, $V_{EVC}$ is cylinder volume at exhaust valve closing position, $V_{IVC}$ is cylinder volume at intake valve closing position, $V_{IVO}$ is cylinder intake valve opening position, and N is engine speed. Valve timing locations intake valve open (IVO) and intake valve closed (IVC) are based on the last set of determined valve timings.

$$FMEP_{Act} = C_0 + C_1 \cdot N + C_2 \cdot N^2 \qquad \text{Equation B}$$

where $FMEP_{Act}$ is friction mean effective pressure, $C_0$-$C_2$ stored, predetermined polynomial coefficients, and N is engine speed.

Cylinder pumping and friction losses of a deactivated cylinder can be based on the following regression equations C and D:

$$PMEP_{Deact} = C_0 + C_1 \cdot N + C_2 \cdot N^2 \qquad \text{Equation C}$$

where $PMEP_{Deact}$ is friction mean effective pressure, $C_0$-$C_2$ are stored, predetermined polynomial coefficients, and N is engine speed.

$$FMEP_{Deact} = C_0 + C_1 \cdot N + C_2 \cdot N^2 \qquad \text{Equation D}$$

where $FMEP_{Deact}$ is friction mean effective pressure, $C_0$-$C_2$ are stored, predetermined polynomial coefficients, and N is engine speed.

The following describes further exemplary details for the regression and interpolation schemes. One dimensional functions are used to store friction and pumping polynomial coefficients for active and inactive cylinders. The data taken to determine the coefficients are collected at a sufficient number of engine speed points to provide the desired torque loss accuracy. Coefficients can be interpolated between locations where no data exists. For example, data can be collected and coefficients can be determined for an engine at engine speeds of 600, 1000, 2000, and 3000 RPM. If the engine is then operated at 1500 RPM, coefficients from 1000 and 2000 RPM can be interpolated to determine the coefficients for 1500 RPM. Total friction losses can then determined by at least one of the following equations:

$$FMEP_{total} = \frac{\left\lfloor \begin{array}{c} Numcyl_{Act} \cdot FMEP_{Act} + \\ Numcyl_{Dact} \cdot FMEP_{Dact}(t_{deact}) \end{array} \right\rfloor}{Numcyl_{total}}$$

or $$FMEP_{total} = Modfact \cdot FMEP_{Act} + (1 - Modfact) \cdot FMEP_{Deact}$$

where $Numcyl_{Act}$ is the number of active cylinders, $Numcyl_{Dact}$ is the number of deactivated cylinders, Modfact is the ratio of the number of active cylinders to total number of cylinders, and $FMEP_{total}$ is the total friction mean effective pressure. Total pumping losses can be determined by one of the following equations:

$$PMEP_{total} = \frac{\left\lfloor \begin{array}{c} Numcyl_{Act} \cdot PMEP_{Act} + \\ Numcyl_{Dactt} \cdot PMEP_{Dact}(t_{deact}) \end{array} \right\rfloor}{Numcyl_{total}}$$

or $$PMEP_{total} = Modfact \cdot PMEP_{Act} + (1 - Modfact) \cdot PMEP_{Dact}$$

where $Numcyl_{Act}$ is the number of active cylinders, $Numcyl_{Dact}$ is the number of deactivated cylinders, Modfact is the ratio of the number of active cylinders to total number of cylinders, and $PMEP_{total}$ is the total pumping mean effective pressure. Additional or fewer polynomial terms may be used in the regressions for $PMEP_{Act}$, $PMEP_{Deact}$, $FMEP_{Act}$, and $FMEP_{Deact}$ based on the desired curve fit and strategy complexity.

The losses based on pressure can be transformed into torque by the following equations:

$$\Gamma_{friction\_total} = FMEP_{total} \cdot \frac{V_D}{4 \cdot \pi} \cdot \frac{N/m^2}{(1 \cdot 10^{-5} \text{bar})}$$

$$\Gamma_{pumping\_total} = PMEP_{total} \cdot \frac{V_D}{4 \cdot \pi} \cdot \frac{N/m^2}{(1 \cdot 10^{-5} \text{bar})}$$

where $V_D$ is the displacement volume of active cylinders.

Then, indicated mean effective pressure (IMEP) for each cylinder can be determined, for example via the equation:

$$IMEP_{cyl}(\text{bar}) = \left(\frac{\Gamma_{brake} - \left(\begin{array}{c}\Gamma_{friction\_total} + \\ \Gamma_{pumping\_total} + \\ \Gamma_{accessories\_total}\end{array}\right)}{\text{Num\_cyl}_{Act}}\right) * \frac{4\pi}{V_D} * \frac{(1*10^{-5} \text{ bar})}{N/m^2} \cdot SPKTR$$

where $\text{Num\_cyl}_{Act}$ is the number of active cylinders, $V_D$ is the displacement volume of active cylinders, SPKTR is a torque ratio based on spark angle retarded from minimum best torque (MBT), i.e., the minimum amount of spark angle advance that produces the best torque amount. Additional or fewer polynomial terms may be used in the regression based on the desired curve fit and strategy complexity. Alternatively, different estimation formats can also be used. The term SPKTR can be based on the equation:

$$SPKTR = \frac{\Gamma_{\Delta SPK}}{\Gamma_{MBT}}$$

where $\Gamma_{\Delta SPK}$ is the torque at a spark angle retarded from minimum spark for best torque (MBT), $\Gamma_{MBT}$ is the torque at MBT. In one example, the actual value of SPKTR can be determined from a regression based on the equation:

$$SPKTR = C_0 + C_1 * \Delta_{spark}^2 + C_2 * \Delta_{spark}^2 * N + C_3 * \Delta_{spark}^2 * IMEP_{MBT}$$

where $C_0$-$C_3$ are stored, predetermined, regressed polynomial coefficients, N is engine speed, and $IMEP_{MBT}$ is IMEP at MBT spark timing. The value of SPKTR can range from 0 to 1 depending on the spark retard from MBT.

Individual cylinder fuel mass can be determined, in one example, for each cylinder by the following equation:

$$m_f = C_0 + C_1 * N + C_2 * AFR + C_3 * AFR^2 + C_4 * IMEP + C_5 * IMEP^2 + C_6 * IMEP * N$$

where $m_f$ is mass of fuel, $C_0$-$C_6$ are stored, predetermined, regressed polynomial coefficients, N is engine speed, AFR is the air-fuel ratio, and IMEP is indicated mean effective pressure. As indicated previously, additional or fewer polynomial terms may be used in the regression based on the desired curve fit and strategy complexity. For example, polynomial terms for engine temperature, air charge temperature, and altitude might also be included.

A desired air charge can be determined from the desired fuel charge. In one example, a predetermined air-fuel mixture (based on engine speed, temperature, and load), with or without exhaust gas sensor feedback, can be used to determine a desired air-fuel ratio. Further, when operating in an alternating valve mode, it may be desirable to have different desired air-fuel ratios for different valves of a cylinder. That is, it may be desirable to have a first air-fuel ratio associated with the operation of a first intake valve, and to have a second air-fuel ratio associated with the operation of a second intake valve. In this way, a cylinder can have alternate valves operating during alternate cylinder cycles, combusting mixtures of alternating air-fuel ratios.

The determined fuel mass from above can be multiplied by the predetermined desired air-fuel ratio to determine a desired cylinder air amount. The desired mass of air can be determined from the equation:

$$m_a = m_f AFR$$

where $m_a$ is the desired mass of air entering a cylinder, $m_f$ is the desired mass of fuel entering a cylinder, and AFR is the desired air-fuel ratio.

In addition, EGR can be determined by indexing a table containing empirically determined EGR amounts. The specific values of table entries are based on engine emissions, combustion stability, and fuel economy. Furthermore, the table can be indexed by engine speed, engine temperature, and cylinder load. The routine then proceeds to step 603.

At step 603, a decision is made to operate a cylinder with two simultaneously operating valves, or to operate the cylinder with alternating valves. The cylinder air amount determined from step 601 is compared to a range of cylinder air amounts that are be available using alternating valve mode and simultaneous valve mode at the present engine speed. In addition, since the cylinder air amount can be a function of available cylinder volume and EGR amount, the EGR amount determined in step 601 can be used to determine if the combined EGR amount and cylinder air amount are possible in alternating valve mode and in simultaneous valve mode. If the desired cylinder air amount and EGR amount is not within the alternating valve mode the valve are then operated in simultaneous valve mode and the routine exits after the decision in step 605. Also, if the engine torque demand or engine load has substantially changed, then the routine can be configured to exit after the decision in step 605. This allows the routine to adapt valve timings only while the engine is operating at substantially steady-state conditions, if desired.

After determining the desired cylinder air charge and the desired valve mode, valve timings can be determined. The routine determines base valve timing by indexing one or more tables and/or functions that are populated with empirically determined valve timings that produce the desired cylinder air charge at the present engine speed. Each valve mode may be assigned specific tables and/or functions that output valve timings for the particular valve mode. Further, different valve timings for valves (j) and (j+1) may be assigned when cylinder (i) is operating in the same or different modes. For example, when the cylinder is operating in an alternating valve mode, each valve may be assigned different base valve timings. In this way, unique valve timings may be is determined for each cylinder mode, if desired. Similarly, base fuel injection timings can be assigned for different cylinder operating conditions.

If alternating valve mode is selected and the engine is at desired conditions, then the routine proceeds to step 605.

At step 605, the routine determines if valves are to be operated in an alternating mode and if operating conditions are conducive for adjusting valve timing and/or injection timing (injection timing includes when fuel is delivered to a cylinder relative to engine position as well and the amount of fuel that is delivered by the fuel injector). If alternating valve mode is selected in step 603 and if the engine is at desired conditions, then the routine proceeds to step 607. Otherwise, the routine exits.

At step 607, the routine determines whether to operate one or another particular intake valve of a particular cylinder. The routine keeps track of which valve operated during the last alternating valve cycle for each cylinder that is operating in alternating valve mode. If there has not been an alternating valve cycle since the engine has started, the routine can be configured to always start with a particular valve or a random valve assignment may be made. If a particular intake valve operated (i.e., opened and closed) during the last cycle of a cylinder, then the intake valve that did not operate (i.e., stayed closed) during the last cycle is selected to operate during the current or next cylinder cycle. The routine then proceeds to step 609.

At step 609, the routine determines the cylinder air charge error and cylinder air-fuel error for each cylinder and each valve that last operated in alternating valve mode. Since valve (j) operates only once every other cylinder cycle of cylinder (i), the amount of air entering cylinder (i) the last time valve (j) operated is stored in memory. This stored value is subtracted from the amount of desired cylinder air amount at the last time valve (j) operated in cylinder (i) and the result is the cylinder air charge error for cylinder (i) valve (j). A cylinder air charge error is determined and stored for each cylinder (i) valve (j) combination. Note (i) and (j) are integer variables that describe particular cylinder and valve combinations.

Likewise, air-fuel ratio error is determined for every cylinder (i) and valve (j) combination that last operated in alternating valve mode. Since valve (j) operates in cylinder (i) only once every other cylinder cycle of cylinder (i), the air-fuel ratio the last time valve (j) operated is stored in memory. This value is subtracted from the amount of desired cylinder air-fuel ratio at the last time valve (j) operated and the result is the cylinder air-fuel error for the cylinder (i) valve (j) combination. In one example, the cylinder air-fuel ratio is determined using an oxygen sensor that senses exhaust gases at a particular time after a combustion event to determine the cylinder air-fuel ratio for the combustion event. The routine proceeds to step 611.

At step 611, the routine decides whether to make valve timing adjustments, fuel amount adjustments, or adjustments of both fuel amount and valve timing. In one embodiment, if the routine determines that the actual engine torque is deviating from the desired engine torque, then valve timing and fuel amounts are adjusted. If the actual engine torque is close to the desired engine torque, but the cylinder air-fuel ratio is deviating from a desired air-fuel ratio, then it may be desirable to adjust only valve timing or only fuel amount. However, fuel injector timing and valve timing can be adjusted in the same cylinder cycle if desired.

In one example, where cylinder air-fuel ration deviates from a desired air-fuel ratio, an initial valve timing adjustment is made, and if the deviation occurs over another cylinder cycle where the same particular intake valve is operating, then a fuel adjustment is made. Further adjustments to valve timing and fuel amount may be made during different cylinder cycles until the air-fuel ratio deviation is substantially eliminated or reduced. Adjustments to injector timing and valve timing are linked to particular cylinders and particular valves. That is, adjustments can be made to timings for particular valves and to timings for particular injectors that are operating during particular cylinder cycles. For example, if fuel injector number two injects fuel when valve number two operates in a particular cycle of cylinder three, then timing adjustments for fuel injector number two and valve number two can be made the next time valve number two operates in cylinder three. The routine maintains a record of the last adjustment type that occurred during the last cylinder cycle for a particular cylinder (j) and valve (i) combination.

If the routine determines that the cylinder air charge and air-fuel ratio are within a desired range for a particular cylinder (i) valve (j) combination, the routine can inhibit updates to injector and valve timing controls. The routine proceeds to step 613.

In step 613, the routine decides whether or not to make valve timing adjustments. Based on the adjustments determined in step 611, the routine determines whether specific valve timing adjustments are to be made or if the valve adjustment procedure should be bypassed. If valve adjustments are desired, the routine proceeds to step 615. If not, the routine proceeds to step 619.

At step 615, the routine determines specific valve timing adjustments for valve (j) that will operate during the current or upcoming (next) cylinder cycle of cylinder (i). Note that some valve control systems will allow valve timings to be determined during the valve cycle when the valve will operate. Other valve systems will require that valve timings be determined one or more cylinder cycles ahead of the planned valve operation. Therefore, adjustment to valve timings may be scheduled during the current cylinder cycle of the next cylinder cycle depending on the valve controller configuration.

To determine the valve timing adjustment, the routine determines the cylinder air charge error when valve (j) operated during the previous cylinder cycle of cylinder (i). Since valve (j) operates only once every other cylinder cycle of cylinder (i), the amount of air entering the cylinder the last time valve (j) operated is stored in memory. This value is subtracted from the amount of desired cylinder air amount at the last time valve (j) operated in cylinder (i), and the result is the cylinder air charge error for the cylinder (i) valve (j) combination. This determination may be made for all cylinders operating in alternating valve mode. The routine proceeds to step 617.

The cylinder air charge error is used to determine an adjustment amount that is added to or subtracted from the base valve timing associated with operating valve (j) in cylinder (i). In one embodiment, the air charge error for the combination of cylinder (i) valve (j) is multiplied by a gain term and the result is added to the base valve timings determined in step 603. In another embodiment, a geometric valve model can be used to estimate the amount of valve closing advance or delay is necessary to eliminate the cylinder air charge error at the present engine speed and operating conditions. The geometric model described in U.S. Pat. No. 6,850,831 is one model that can be used to determine the valve adjustment based on cylinder air charge error and is hereby fully incorporated by reference for all purposes. The routine proceeds to step 617.

At step 617, the routine stores the valve adjustment determined in step 615 to memory. In one embodiment, the valve adjustment is stored in an array that is indexed by engine speed and cylinder load. The routine proceeds to step 619.

In step 619, the routine decides whether or not to make fuel injector timing adjustments. Based on the adjustments determined in step 611, the routine determines whether specific fuel injector timing adjustments are to be made, or if the fuel injector adjustment procedure should be bypassed. If fuel injector adjustments are desired, the routine proceeds to step 621. If not, the routine proceeds to step 625.

At step 621, the routine determines fuel injector adjustments for the valve (j) that will operate during the current or next cylinder cycle of cylinder (i). Note that some injection control systems will allow injection timings to be determined during the current cylinder cycle of cylinder (i) while other injection controllers will require that injection timings be determined during the previous cylinder cycle of cylinder (i). Therefore, adjustment to injection timings may be scheduled during the current cylinder cycle or during the past cylinder cycle depending on the injector controller configuration. The routine determines the cylinder air-fuel error when valve (j) operated in the last cylinder cycle of cylinder (i).

In one embodiment, cylinder air-fuel error is determined from sampling exhaust gases at a specific time after combustion has occurred in cylinder (i) during a cylinder cycle in which valve (j) opened to allow air to be inducted into the cylinder. Oxygen concentration in the exhaust gases provides an inference of the air-fuel ratio that was combusted in the cylinder. The exhaust gas based air-fuel ratio is subtracted from the desired cylinder air-fuel ratio to determine the air-fuel error that relates to operation of valve (j) in cylinder (i) during a particular cylinder cycle. In one embodiment, the air-fuel ratio error is multiplied by a gain term, and the result is then added to the base injection timing associated with operating valve (j) during a cylinder cycle of cylinder (i) at the present engine operating conditions.

When a single injector is used to target both intake ports of a cylinder, the fuel adjustment is made to the injection event that occurs just prior to or during valve (j) opening. Of course, increasing or decreasing the amount of fuel delivered just prior to or during the valve (j) opening event can affect the fuel puddle that is present when valve (j+1) opens (i.e., the other valve in the same cylinder). Therefore, the fuel delivered just prior to the valve opening event for valve (j) may also be updated to reflect the change in the fuel puddle that is expected to be inducted into the cylinder when valve (j+1) is opened. The routine proceeds to step 623.

In step 623, the routine stores the injection adjustment that was determined in step 621 to memory. In one embodiment, the injector adjustment is stored in an array that is indexed by engine speed and cylinder load. The routine proceeds to step 625.

In step 625, the routine decides whether or not to update cylinder valve timing and/or fuel injector timing. If the routine has determined that adjustments are desired from operations of previous steps, then the routine proceeds to step 627. Otherwise, the routine exits.

In step 627, the routine outputs the adjusted valve timings and/or fuel injector timings. The valve adjustment determined in step 615 can be combined with the base valve timings determined in step 603 to produce a revised valve timing that moves the actual cylinder air charge closer to the desired cylinder air charge. The revised valve timing may be sent to a dedicated valve controller or it may be directly applied to the valve by the engine controller.

Likewise, the fuel injector adjustment determined in step 621 can be combined with the base injector timings determined in step 603 to produce a revised injector timing that moves the actual cylinder air-fuel ratio closer to the desired cylinder air-fuel ratio. The revised injection timing may be made to the injector from the engine controller. After outputting the new injection timing commands and/or valve timings, the routine exits.

Note that an additional step can be added to the routine before the routine exits whereby spark timing can be adjusted in response to any valve or injector timing adjustments. In particular, spark can be advanced if the cylinder air charge is reduced or if the cylinder air-fuel ratio is increased. On the other hand, spark can be retarded if the cylinder air charge is increased or if the cylinder air-fuel ratio is decreased. It should also be recognized that the spark can be adjusted based on the operation of a particular valve during a particular cylinder cycle. That is, spark may be advanced or retarded when valve (j) operates as compared to when valve (j+1) operates during a cycle if cylinder (i), for example.

As will be appreciated by one of ordinary skill in the art, the routines described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to adjust air-fuel-ratio of a cylinder with a first and second intake valve (IV), comprising:
    operating only the first IV during a first combustion cycle with a first IV timing and a first fuel injection timing; and
    operating only the second IV during a second combustion cycle with a second, different, IV timing and a second, different, fuel injection timing, the first combustion cycle occurring immediately after the second combustion cycle in the cylinder.

2. The method of claim 1 wherein said first IV and said second IV are electrically actuated valves.

3. The method of claim 1 wherein an IV closing position of said first IV is later than an IV closing position of the second IV.

4. The method of claim 1 wherein the second IV has a later valve timing than the first IV.

5. The method of claim 1 wherein the second fuel injection timing is adjusted during a current cylinder cycle of the cylinder in response to an oxygen sensor output that that occurred two cylinder cycles of said cylinder before said current cylinder cycle.

6. The method of claim 1 wherein said first fuel injection timing and said second fuel injection timing are for a single fuel injector.

7. The method of claim 1 wherein spark timing is adjusted in response to said first IV timing and said second IV timing.

8. The method of claim 1 wherein the second IV timing is adjusted during a current cylinder cycle of the cylinder in response to a cylinder air charge that was inducted into said cylinder during a cylinder cycle that occurred two cylinder cycles of said cylinder before said current cylinder cycle.

9. The method of claim 8 wherein said first IV timing and said first fuel injection timing are based on a cylinder charge error determined from and exhaust gas oxygen sensor.

10. A method to adjust air-fuel-ratio of a cylinder with a first and second intake valve (IV), comprising:
    operating only the first IV during a first combustion cycle with first IV, fuel injection, and spark, timings; and
    operating only the second IV during a second combustion cycle with second, different, IV, fuel injection, and spark, timings, the first combustion cycle occurring immediately after the second combustion cycle in the cylinder.

11. The method of claim 10 wherein said first IV timing and said first injection timing are based on a cylinder charge error determined from and exhaust gas oxygen sensor.

12. The method of claim 10 wherein the second fuel injection timing is adjusted during a current cylinder cycle of the cylinder in response to an oxygen sensor output that that occurred two cylinder cycles of said cylinder before said current cylinder cycle.

13. The method of claim 10 wherein said first injection timing and said second injection timing are for a single fuel injector.

14. The method of claim 10 wherein said first and second intake IV are electrically actuated.

15. A method to adjust air-fuel-ratio of a cylinder with a first and second intake valve (IV), comprising:
   operating only the first IV during a first combustion cycle of said cylinder with first IV, fuel injection, and spark, timings;
   operating only the second IV during a second combustion cycle of said cylinder with second, different, IV, fuel injection, and spark, timings, the first combustion cycle occurring immediately after the second combustion cycle in the cylinder;
   adjusting the second IV timing of only the second IV after said first combustion cycle in response to an amount of air inducted into said cylinder during said second combustion cycle, and adjusting the fuel injection timing after said first combustion cycle in response to exhaust gases from said second combustion cycle.

16. The method of claim 15 wherein said first IV and said second IV are electrically actuated valves.

17. The method of claim 15 wherein an IV closing position of said first IV or said second intake valve is later than an intake valve closing position of the other intake valve.

18. The method of claim 15 wherein an amount of fuel delivered to said cylinder during a first cylinder cycle is different than an amount of fuel delivered to said cylinder during said second combustion cycle.

19. The method of claim 15 wherein said first fuel injection timing and said second fuel injection timing are for a single fuel injector.

20. The method of claim 15 wherein said first IV and said second IV are open for substantially the same amount of time.

* * * * *